(12) United States Patent
Ito et al.

(10) Patent No.: US 8,549,758 B2
(45) Date of Patent: Oct. 8, 2013

(54) COUPLING APPARATUS FOR COUPLING BLADE PROTECTOR TO TOOL BODY OF GARDENING TOOL

(75) Inventors: Ryosuke Ito, Anjo (JP); Masaki Kondo, Anjo (JP); Katsumi Okouchi, Anjo (JP)

(73) Assignee: Makita Corporation, Anjo (JP)

( * ) Notice: Subject to any disclaimer, the term of this patent is extended or adjusted under 35 U.S.C. 154(b) by 343 days.

(21) Appl. No.: 12/813,580

(22) Filed: Jun. 11, 2010

(65) Prior Publication Data

US 2010/0319203 A1 Dec. 23, 2010

(30) Foreign Application Priority Data

Jun. 18, 2009 (JP) ................................. 2009-145388

(51) Int. Cl.
- *A01D 34/68* (2006.01)
- *A01D 75/20* (2006.01)
- *B26B 29/00* (2006.01)

(52) U.S. Cl.
USPC .............................................. 30/276; 30/286

(58) Field of Classification Search
USPC .................................................... 30/276, 286
See application file for complete search history.

(56) References Cited

U.S. PATENT DOCUMENTS

| | | | | |
|---|---|---|---|---|
| 1,970,078 A * | 8/1934 | Dillon | ............................... | 285/18 |
| 2,532,982 A * | 12/1950 | De Young | ........................ | 30/390 |
| 3,453,732 A * | 7/1969 | Wilkin | .......................... | 30/296.1 |
| 5,077,898 A * | 1/1992 | Hartwig | ............................ | 30/276 |
| 5,383,330 A * | 1/1995 | Yokocho et al. | ................. | 56/256 |
| 5,414,934 A * | 5/1995 | Schlessmann | ................ | 30/275.4 |
| 5,493,784 A | 2/1996 | Aiyama | | |
| 5,878,556 A | 3/1999 | Franz | | |
| 5,924,205 A * | 7/1999 | Sugihara et al. | ................. | 30/276 |
| 6,508,004 B2 * | 1/2003 | Tezuka et al. | .................... | 30/276 |
| 6,886,258 B2 * | 5/2005 | Swanson | .......................... | 30/276 |
| 6,971,178 B2 * | 12/2005 | Rowlay | ............................ | 30/162 |
| 7,921,536 B2 * | 4/2011 | Dole | .............................. | 29/463 |
| 2001/0034940 A1 * | 11/2001 | Marshall et al. | ................. | 30/276 |
| 2010/0304649 A1 * | 12/2010 | Sugiura et al. | ................. | 451/452 |

FOREIGN PATENT DOCUMENTS

| | | |
|---|---|---|
| EP | 2 263 440 | * 12/2010 |
| JP | U-46-027981 | 9/1971 |
| JP | U-57-018330 | 1/1982 |
| JP | U-58-009521 | 1/1983 |
| JP | U-61-044015 | 3/1986 |
| JP | U-03-119610 | 12/1991 |
| JP | U-6-57118 | 8/1994 |
| JP | U-07-005319 | 1/1995 |
| JP | U-7-7330 | 2/1995 |
| JP | A-2003-153602 | 5/2003 |
| JP | A-2003-156026 | 5/2003 |
| RU | 2 033 285 C1 | 4/1995 |

(Continued)

OTHER PUBLICATIONS

Office Action issued in Russian Patent Application No. 2010124868/21(035391) dated Sep. 13, 2011 (with translation).

(Continued)

*Primary Examiner* — Hwei C Payer

(74) *Attorney, Agent, or Firm* — Oliff & Berridge, PLC

(57) ABSTRACT

A coupling member can releasably couple a blade protector to a tool body of a gardening tool. The coupling member is movably and non-removably coupled to one of the tool body and the protector.

17 Claims, 12 Drawing Sheets

(56) References Cited

FOREIGN PATENT DOCUMENTS

| | | | |
|---|---|---|---|
| RU | 52638 | U1 | 4/2006 |
| SU | 268803 | A | 4/1970 |
| SU | 798378 | A | 1/1981 |
| SU | 1681076 | A1 | 9/1991 |

OTHER PUBLICATIONS

Nov. 6, 2012 Notification of Reasons for Rejection issued in Japanese Patent Application No. 2009-145388 (with translation).
Jun. 25, 2013 Office Action issued in Japanese Patent Application No. 2009-145388 (with translation).

* cited by examiner

US 8,549,758 B2

COUPLING APPARATUS FOR COUPLING BLADE PROTECTOR TO TOOL BODY OF GARDENING TOOL

This application claims priority to Japanese patent application serial number 2009-145388, the contents of which are incorporated herein by reference.

BACKGROUND OF THE INVENTION

1. Field of the Invention

The present invention relates to a coupling apparatus for coupling a blade protector to a tool body of a gardening tool.

2. Description of the Related Art

In general, gardening tools, in particular, brush cutters or grass cutters used outdoors for cutting grasses or the like, have a support rod and a rotary blade mounted to a front end of the support rod. The support rod has a suitable length for operation by a user who operates standing-up. A handle extends laterally in right and left directions from a middle portion of the support rod and can be grasped by the user. A drive device for rotatably driving the blade is mounted to the rear side of the support rod. An engine-type drive device or a motor-type drive device has been used as the drive device. A disk-type rotary cutter with tips secured to the periphery may be used as the cutting blade. Alternatively, vinyl cords may be used as the cutting blade.

The cutting blade is supported at the front end of the support rod via a gear head portion. A protector is coupled to the rear side (i.e., the side of user) of the cutting blade for preventing cut grasses or ground pebbles from bouncing toward the user. Normally, the protector has a size capable of covering about one third of the entire circumference of the rotary blade to mainly cover the side of the user. A repairer sometime may remove the protector for the maintenance or repair service of the gear head or other. The protector is coupled to the support rod by a coupling apparatus. For example, the coupling apparatus may include a fixing screw as a coupling member. The fixing screw is tightened for fixedly coupling the protector to the support rod. In this case, the protector can be removed from the support rod by loosening and removing the fixing screw. The coupling apparatus using the fixing screw as the coupling member is disclosed, for example, in Japanese Laid-Open Utility Model Publication No. 7-7330.

However, if the fixing screw has been removed from the protector, a troublesome work is required for setting the fixing screw again when the protector is mounted again after the maintenance work or the repair service. In addition, the fixing screw may be lost.

Therefore, there is a need in the art for preventing removal of a coupling member that couples a blade protector to a cutting device.

SUMMARY OF THE INVENTION

A coupling member can releasably couple a blade protector to a tool body of a gardening tool. The coupling member is movably and non-removably coupled to one of the tool body and the protector.

DETAILED DESCRIPTION OF THE INVENTION

Figure 1:
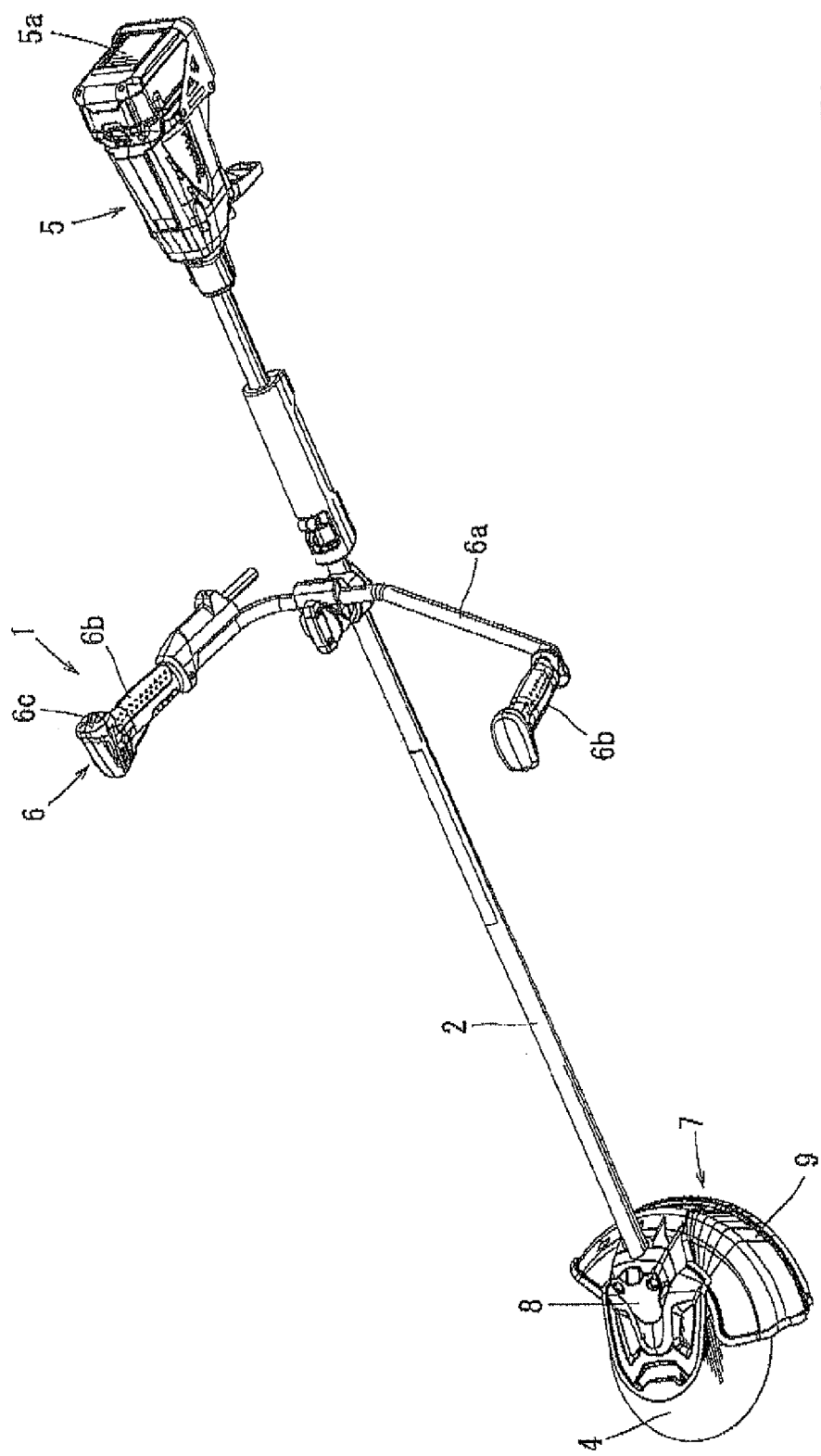
FIG. 1 is a vertical sectional view of a brush cutter according to a representative example.

Each of the additional features and teachings disclosed above and below may be utilized separately or in conjunction with other features and teachings to provide improved coupling apparatus for coupling a blade protector to a tool body of a gardening tool. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one example, a coupling apparatus includes a coupling member and a removal preventing device. The coupling member is movable in a coupling direction for coupling a protector to a tool body of the gardening tool. The removal preventing device is provided at the protector and capable of restricting movement of the coupling member in a direction opposite to the coupling direction when the coupling member does not couple the protector to the tool body.

With this arrangement, when the coupling member is moved to release coupling of the protector to the tool body of the gardening tool, this movement is prevented by the removal preventing device, so that the coupling member is prevented from being removed from the protector. Therefore, the coupling member can be readily used for again coupling the protector to the tool body, for example, after the maintenance work of the blade. Hence, it is possible to efficiently perform the coupling operation of the protector. In addition, because the coupling member is prevented from being removed from the protector, the coupling member may not be lost. The efficiency of the coupling operation is improved also in this respect.

The protector may include a first member and a second member. The coupling member can couple the first and second members to each other with an intervention of a part of the tool body, so that the first and second members are coupled to the tool body. The protector may have a receiving hole formed therein for receiving a part of the coupling member. The removal preventing device may be disposed at an inlet portion of the receiving hole for restricting the movement of the coupling member in the direction opposite to the coupling direction.

With this arrangement, the protector may be removed from the tool body by releasing the coupling between the first member and the second member of the protector. As the coupling member moves to release the coupling, a part of the coupling member may interact with the removal preventing device, so that the movement of the coupling member in the opposite direction to the coupling direction can be restricted. As a result, the coupling member is prevented from being removed from the protector.

The coupling member may be a screw and the removal preventing device may be a rubber ring. Therefore, the first member and the second member of the protector are coupled to each other by the screw. The screw may have a head received within the receiving hole, so that the head may interfere with the rubber ring that is disposed at the inlet portion of the receiving hole. As the screw and the rubber ring, commercially available products can be used. Therefore, the manufacturing cost can be reduced.

The receiving hole may be formed in the first member of the protector for receiving the head of the screw and may include a mounting hole disposed at the inlet portion, so that the rubber ring is mounted within the mounting hole.

At least one claw may be formed on an inner circumference of an inlet of the mounting hole and may extend radially inwardly therefrom, so that the rubber ring is held in position by the at least one claw.

A relief recess may be formed in an inner circumference of the receiving hole at a position corresponding to the at least one claw. The relief recess enables the at least one claw to be molded together with the first member of the protector by a molding process of the first member. With this arrangement, the removal preventing device can be manufactured at a lower cost because it is not necessary to form a recess for receiving the rubber ring by a cutting operation.

The screw may have a large diameter member mounted to the screw at a position proximal to the head. The large diameter portion may have a diameter larger than the head, so that the large diameter portion can interact with the rubber ring for preventing the screw from moving in the direction opposite to the coupling direction. With this arrangement, it is possible to minimize the depth of the receiving hole and to ensure a sufficient moving distance required for tightening the screw.

In another configuration, the removal preventing device may be an outer nut having a male thread engaging with the receiving hole, a restricting sleeve fitted into the receiving hole or a cover mounted to the first member of the protector.

In another configuration, the removal preventing device is a restriction sleeve integrated with the first member of the protector by an insertion molding process. The restriction sleeve has an insertion hole, into which a threaded shank of the screw is inserted. In addition, a stationary nut may be integrated with the second member of the protector by an insertion molding process. The threaded shank of the screw may engage the stationary nut, so that the movement of the screw in the direction opposite to the direction of tightening into the nut is prevented by the restricting sleeve when the screw is disengaged from the stationary nut.

In another configuration, the removal preventing device may be a flange integrally molded with an inner circumference of the inlet portion of the receiving hole and protruding inwardly therefrom. Also with this arrangement, it is possible to manufacture the removal preventing device at a lower cost. In addition, because the first member having the receiving hole can be separated from a molding die in the same direction as the coupling direction of the coupling member after the molding process of the first members, it is possible to mount an outer nut or a restricting sleeve at the opposite end to the inlet of the receiving hole in order to restrict the opposite end of the receiving hole.

In another configuration, the removal preventing device is a clip mounted to the coupling member. The clip can resiliently deform to interact with a part of the protector for preventing the coupling member from moving in the direction opposite to the coupling direction.

A maximum moving distance of the coupling member required for coupling the protector to the tool body of the gardening tool may be equal to or smaller than a maximum distance between the part of the coupling member and the removal preventing device. With this arrangement, it is possible to release the coupling of the protector to the tool body before the movement in the direction opposite to the coupling direction of the coupling member is restricted by the removal preventing device.

Figure 2:
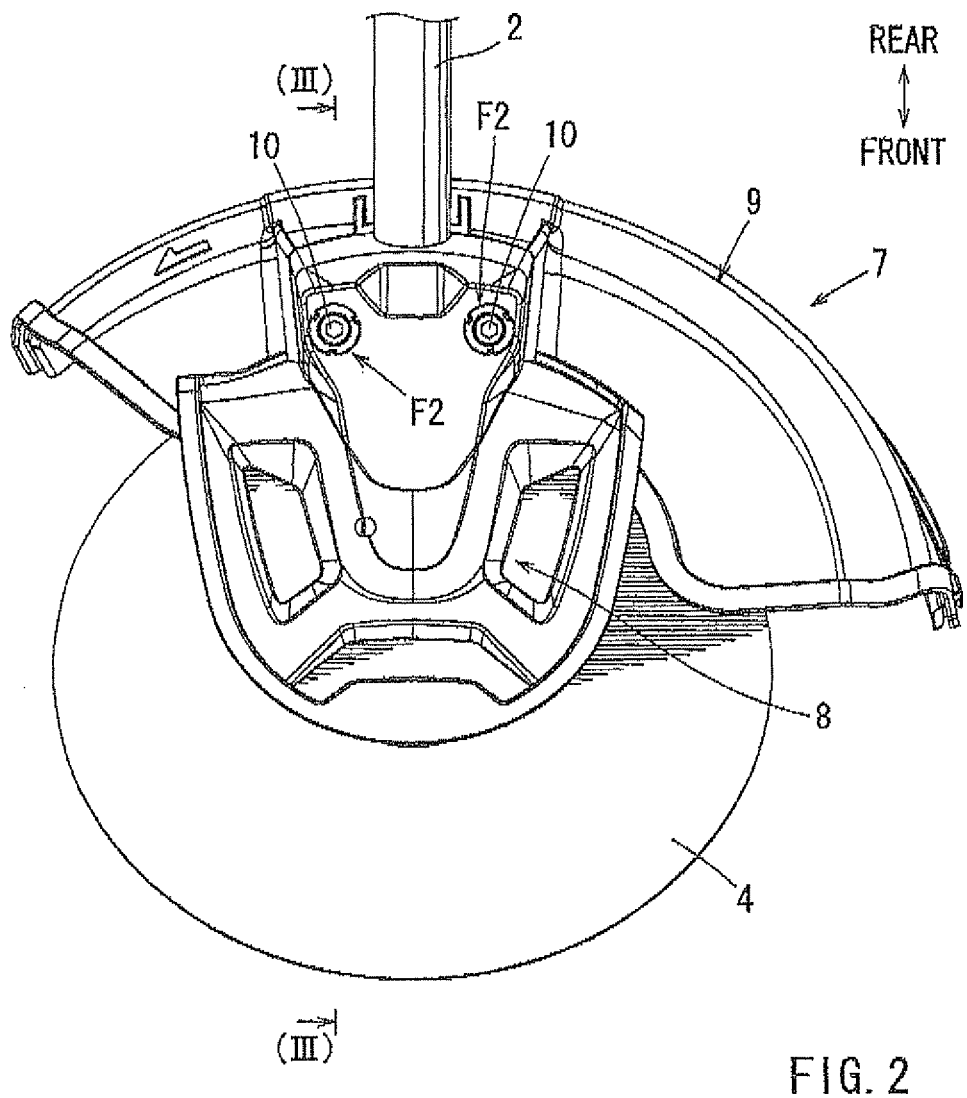
FIG. 2 is a plan view of a rotary blade and its associate structure disposed at a front portion of the brush cutter.
Figure 3:
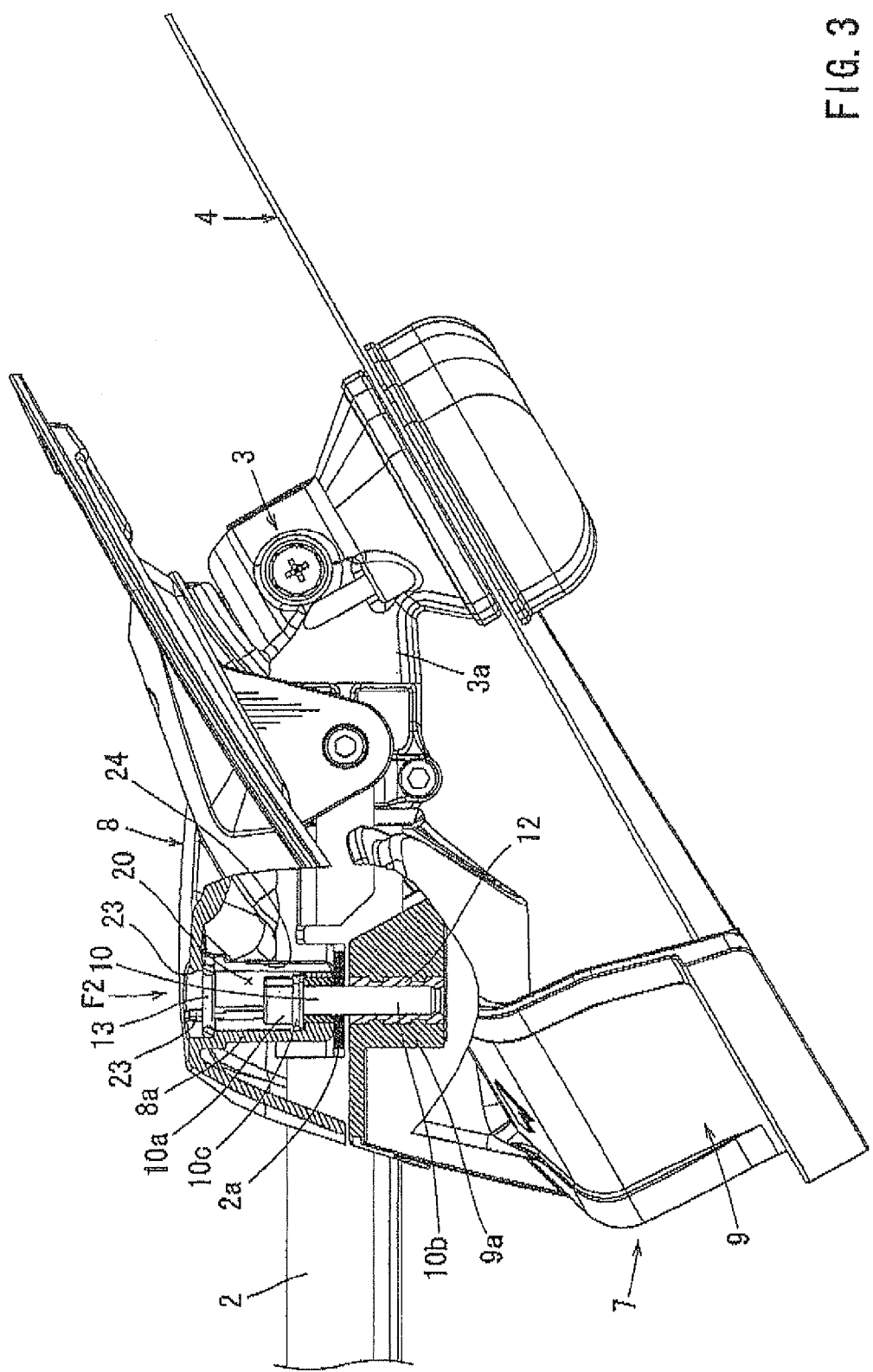
FIG. 3 is a side view of the rotary blade and its associate structure and showing a protector mount portion in a cross sectional view taken along line in FIG. 2.

Several examples will now be described with reference to FIGS. 1 to 21. FIGS. 1 to 3 show a general construction of a brush cutter 1 (or a grass cutter). In FIGS. 1 to 3, the brush cutter 1 is shown to have a coupling apparatus incorporating a second removal preventing configuration F2 that will be explained latter. However, the general construction of the brush cutter 1 shown in FIGS. 1 to 3 can also be applied to coupling apparatus incorporating removal preventing configurations F1 and F3 to F12 that will be explained later. Therefore, the general construction of the brush cutter 1 will be first described.

Referring to FIGS. 1 to 3, the brush cutter 1 as an example of a gardening tool generally includes an elongated metallic support rod 2, a gear head 3 mounted to the front end of the support rod 2, a circular cutting blade 4 mounted to an output shaft of the gear head 3, a drive device 5 mounted to the rear end of the support rod 2, and a handle 6 mounted to a middle portion of the support rod 2. In this example, the support rod 2 and the gear head 3 constitute a tool body of the brush cutter 1.

An electric motor (not shown) driven by a rechargeable battery pack 5a as a power source is disposed within the drive device 5. The output of the motor is transmitted to the gear head 3 via an extension rod inserted into the support rod 2. The handle 6 includes right and left handle supports 6a extending right and left from the middle portion of the support rod 2 and also includes grip portions 6b provided at end portions of the handle supports 6a. A switch 6c is mounted to the right grip portion 6b. The user can grasp the grip portions 6b with his or her both hands and can turn on the switch 6o by the right hand fingertip(s), so that the drive device 5 is started to rotate the rotary blade 4.

FIGS. 2 and 3 show the details of the gear head 3 and the rotary blade 4 at the front end of the support rod 2. The gear head 3 has a gear head case 3a in which a bevel gear on the side of the extension rod (drive side) and a bevel gear on the side of a spindle (driven side) are disposed. The gear head case 3a is fixedly mounted to the front end of the support rod 2. The spindle protrudes obliquely forwardly from the rear side of the gear head case 3a. The rotary blade 4 is mounted to the protruded end of the spindle.

A protector 7 is disposed on the rear side of the gear head 3. The protector 7 includes a protector cover 8 covering mainly the upper side of the gear head 3 and a protector body 9 covering mainly the rear side of the rotary blade 4. The protector cover 8 and the protector body 9 are made of resin. The protector 7 is mounted to the front end of the support rod 2 by clamping the front end of the support rod 2 from upper and lower sides by the protector cover 8 and the protector body 9. Therefore, the protector 7 can be removed from the support rod 2 by separating the protector cover 8 and the protector body 9 from each other.

More specifically, the protector cover 8 and the protector body 9 are coupled to each other by a coupling apparatus that will be hereinafter described. The coupling apparatus includes two fixing screws 10 as coupling members. The front end of the support rod 2 has right and left mount flanges 2a protruding right and left from the front end, respectively. The mount flanges 2a may be mounted to or formed with the support rod 2. With the mount flanges 2a clamped between a boss portion 8a of the protector cover 8 and a boss portion 9a of the protector body 9, the fixing screws 10 are tightened, so that the protector cover 8 and the protector body 9 are fixedly coupled to the support rod 2. Therefore, in this example, the fixing screws 10 serve as coupling members for coupling the protector 7 to the support rod 2.

Several configurations F1 to F12 for preventing fixing screws of the coupling apparatus from being accidentally removed from the protector 7 configured as described above will now be described with reference to FIGS. 4 to 21. Any of the configurations F1 to F12 can prevent the fixing screws from being removed from the boss portion 8a of the protector cover 8 when the protector 7 is removed from the support rod 2. In FIGS. 4 to 21, same or similar members are given the same reference numerals. In addition, in FIGS. 4 to 21, each of the removal preventing configurations F1 to F12 is shown only in connection with one of the fixing screws, however, it should be noted that the same removal preventing configuration is also used for the other of the fixing screws.

First Configuration

Figure 4:
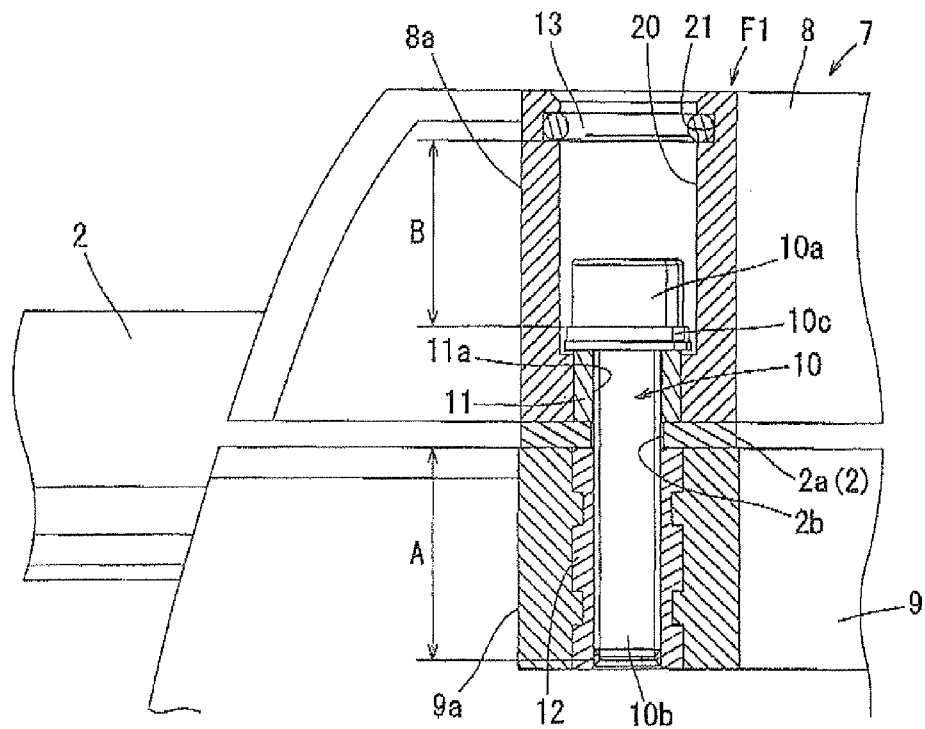
FIG. 4 is a vertical sectional view of a first configuration for preventing removal of a coupling member.

A first configuration F1 is shown in FIG. 4. In this configuration, each of the fixing screws 10 (only one fixing screw 10 is shown in FIG. 4) is a cap screw and has a head 10a and a threaded shank 10b. A hexagon hole is formed in the head 10a for engagement with a hexagon wrench. In addition, the fixing screw 10 is configured as Sems® screw and has a washer 10c having a diameter larger than the head 10a and non-removably assembled below the head 10a. The washer 10c is an example of a member having a larger diameter than the head 10a. In this connection, two head receiving holes 20 (only one head receiving hole 20 is shown in FIG. 4) for receiving the heads 10a of the fixing screws 10 are formed in the boss portion 8a of the protector cover 8. A rubber ring 13 is fitted into the inner circumference of an inlet portion of the head receiving hole 20 and serves as a device for preventing removal of the fixing screw 10 as will be explained later. In this example, by way of a cutting operation, a rubber ring mount recess 21 is formed in the inner circumference of the inlet portion of the head receiving hole 20 and extends along the entire inner circumference. Therefore, the rubber ring 13 is fitted into and along the mount recess 21.

The sizes of the head 10a and the washer 10c of the fixing screw 10 are set such that the head 10a can pass through the inside of the rubber ring 13 but the washer 10c cannot pass through it. Therefore, the rubber ring 13 prevents the fixing screw 10 from being completely removed (withdrawn) from the corresponding head receiving hole 20. The rubber ring 13 may be a commercially available O-ring. Two metallic sleeves 11 (only one metallic sleeve 11 is shown in FIG. 4) allowing insertion of the shanks 10b of the fixing screws 10 are mounted within the bottom walls of the corresponding head receiving holes 20 and are integrated therewith by an insertion molding process. On the other hand, stationary nuts 12 are mounted within the boss portion 9a of the protector body 9 and are integrated therewith by an insertion molding process.

Therefore, by engaging the threaded shanks 10b of the fixing screws 10 with the corresponding stationary nuts 12 and tightening into the stationary nuts 12, the protector cover 8 and the protector body 9 are coupled to each other with the intervention of the front end portion of the support rod 2, so that the protector 7 can be coupled to the front end of the support rod 2. Because the fixing screws 10 are inserted into the insertion holes 2b of the mount flanges 2a, the protector 7 can be fixed in positioned not to rotate relative to the support rod 2 and not to move in the longitudinal direction of the support rod 2.

According to the first configuration F1, even in the case that the threaded shank 10b of one or each of the fixing screws 10 has been removed from the corresponding stationary nut 12, the threaded shank 10b is held to be inserted into the insertion hole 11a of the corresponding sleeve 11 because the washer 10c cannot pass through the inside of the rubber ring 13. As a result, the fixing screws 10 can be prevented from being accidentally removed from the boss portion 8a.

Here, a maximum tightening depth "A" of the threaded shank 10b into the stationary nut 12 indicated in FIG. 4 is set to be equal to or smaller than a distance "B" between the washer 10c and the rubber ring 13 indicated in FIG. 4. Thus the relationship "A≤B" exists. Therefore, it is allowed to completely loosen one of the fixing screws 10 prior to loosening the other of the fixing screws 10. For this reason, it is not necessary to perform troublesome operations in which the right and left fixing screws 10 are alternately loosened little by little to gradually separate the protector cover 8 and the protector body 9 from each other in order to remove the protector 7 from the support rod 2. Hence, the maintenance work can be facilitated. In other words, by incorporating the removal preventing device for preventing removal of the fixing screws 10 from the boss portion 8a of this example, it is possible to eliminate any inconvenience in the maintenance work (or reduction in efficiency of the maintenance work).

In the case that the depth of the head receiving hole 20 is set to be smaller (shallower) to result the relationship "A>B", in order to completely remove the threaded shank 10b from the stationary nut 12, it is necessary to position the protector cover 8 to be spaced from the protector body 9 such that the washer 10c does not contact the rubber ring 13 because the removal of the head 10a (or the washer 10c) from the head receiving hole 20 is prevented by the rubber ring 13. In contrast, according to the above configuration, it is not necessary to perform such a troublesome operation and the fixing screws 10 can be loosened independently of each other.

Further, in the above configuration, the head 10a of each fixing screw 10 is allowed to pass through the inner circumferential side of the rubber ring 13 but the washer 10c is prevented from passing therethrough. Therefore, it is possible to ensure a sufficient value for the distance B without need of unnecessarily thickening the boss portion 8a.

Second Configuration

Figure 5:
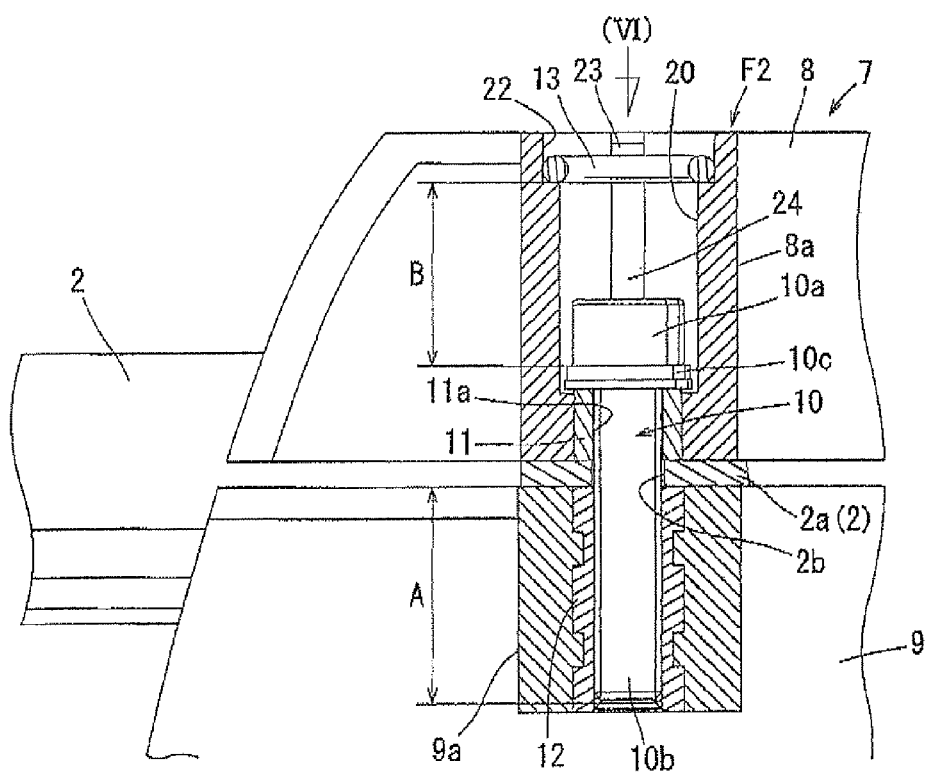
FIG. 5 is a cross sectional view taken along line V-V in FIG. 6 of a second configuration for preventing removal of a coupling member.
Figure 6:
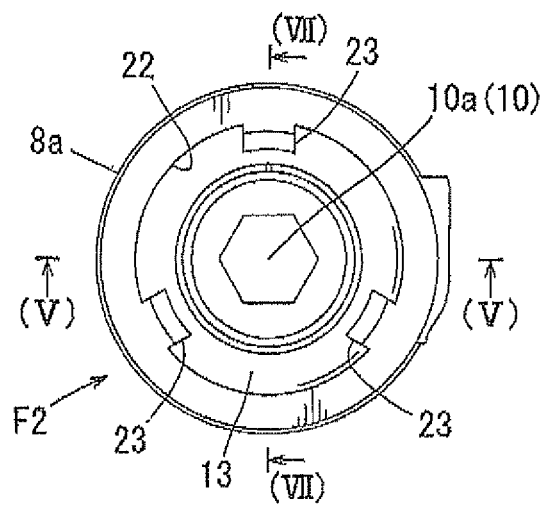
FIG. 6 is a plan view as viewed in a direction of arrow VI in FIG. 5 of the second configuration.
Figure 7:
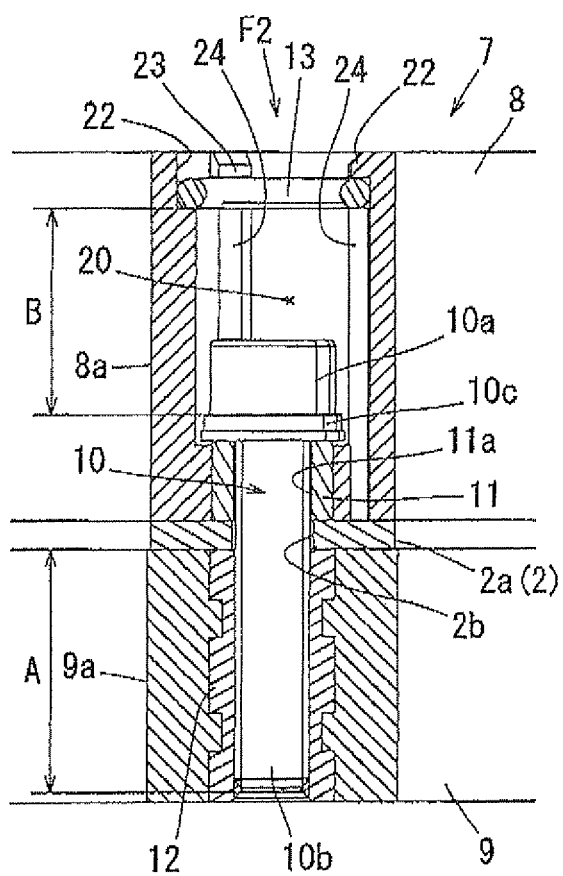
FIG. 7 is a vertical sectional view taken along line VII-VII in FIG. 6 of the second configuration.

A second configuration F2 will now be described with reference to FIGS. 5 to 7. This configuration is a modification of the first configuration F1 and is different from the first configuration F1 only in the mounting structure of the rubber ring 13 to the head receiving hole 20.

In this configuration F2, at the inlet portion of the head receiving hole 20, a mounting hole 22 is formed in place of the mounting recess 21 and has a diameter greater than the diameter of the head receiving hole 20. The rubber ring 13 is fitted into the mounting hole 22 so as to be positioned at the bottom of the mounting hole 22. Claws 23 are formed on the inner circumference of the inlet part of the mounting hole 22 and protrude radially inwardly therefrom. In this configuration F2, three claws 23 are provided and are spaced equally from each other in the circumferential direction as shown in FIG. 6. With these claws 23, the rubber ring 13 is prevented from being removed from the mounting hole 22.

Also in this configuration F2, the relationship between the maximum tightening depth "A" of the threaded shank 10b into the stationary nut 12 and the distance "B" between the washer 10c and the rubber ring 13 indicated in FIG. 4 is set to be the same as in the first configuration F1. Therefore, as in the first configuration F1, even after the fixing screw 10 has been completely removed from the stationary nut 12, the washer 10c cannot pass through the inner circumferential side of the rubber ring 13, and therefore, the threaded shank 10b is held inserted into the insertion hole 11a of the sleeve 11. As a result, the fixing screw 10 is prevented from being removed form the boss portion 8a and eventually from the protector cover 8.

Further, in the case of the second configuration F2, by providing grooves 24 extending in the axial direction at positions corresponding to the claws 23 along the inner circumference of the mounting hole 22, the mounting hole 22 and the claws 23 can be formed by a molding process using the same molding die. Therefore, it is not necessary to additionally perform a cutting operation of the rubber ring mounting recess 21 as in the first configuration F1.

Third Configuration

Figure 8:
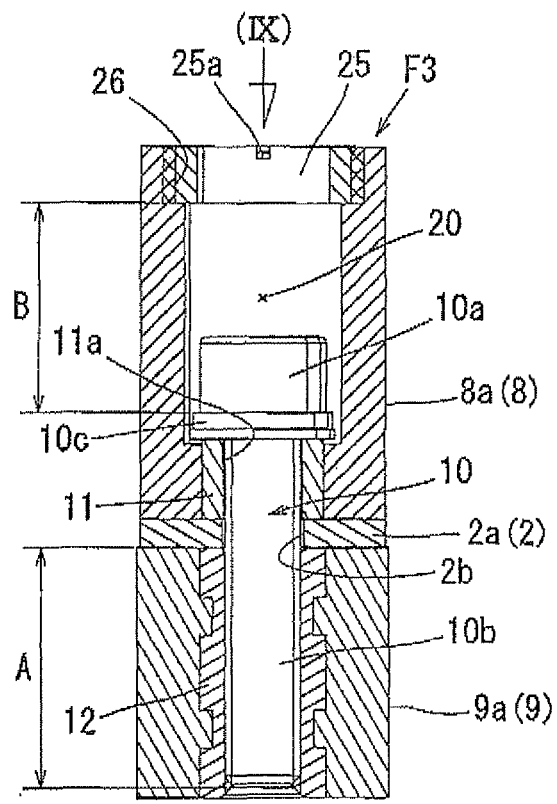
FIG. 8 is a vertical sectional view of a third configuration for preventing removal of a coupling member.
Figure 9:
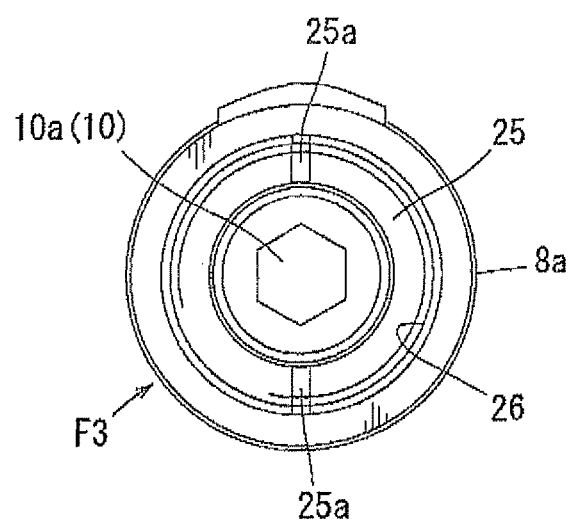
FIG. 9 is a plan view as viewed in a direction of arrow IX in FIG. 8 of the third configuration.

A third configuration F3 will now be described with reference to FIGS. 8 and 9. The third configuration F3 is different from the first and second configurations F1 and F2 in that a sleeve 25 having a male thread formed on the outer circumferential surface is used in place of the rubber ring 13. The sleeve 25 having the male thread will be hereinafter also called "outer nut." The outer nut 25 is threadably engaged with a threaded hole 26 formed at the inlet portion of the head receiving hole 20. A pair of grooves 25a are formed at the axially outer end surface of the outer nut 25 and are configured to be able to engage with a flathead screwdriver, so that the outer nut 25 can be removed by using the flathead screwdriver for performing the maintenance work of the gear head 3 or the like.

The inner diameter of the outer nut 25 is set such that the head 10a of the fixing screw 10 can pass through the inner circumference of the outer nut 25 but the washer 10c cannot pass through the same. Therefore, the fixing screw 10 can be held in a state that the head 10a is positioned within the head receiving hole 20 while the threaded shank 10b being inserted into the insertion hole 11a. As a result, it is possible to prevent the fixing screw 10 from being removed from the boss portion 8a and eventually from the protector cover 8. The relationship between the maximum tightening depth "A" of the threaded shank 10b into the stationary nut 12 and the distance "B" between the washer 10c and the outer nut 25 is set to be the same as in the first and second configurations F1 and F2. Therefore, even in the case that the fixing screw 10 has been loosened and the threaded shank 10b has been completely removed from the stationary nut 12, the threaded shank 10b can be held inserted into the corresponding insertion hole 11a of the sleeve 11. As a result, the fixing screw 10 can be prevented from being removed.

Fourth Configuration

Figure 10:
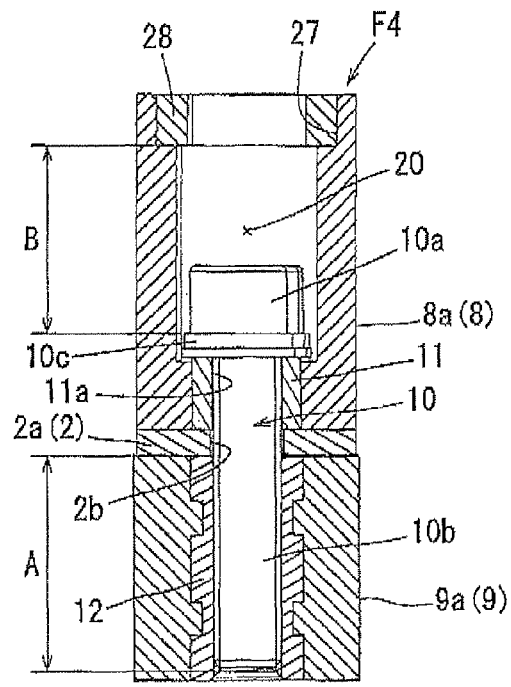
FIG. 10 is a vertical sectional view of a fourth configuration for preventing removal of a coupling member.

A fourth configuration F4 will now be described with reference to FIG. 10. In this configuration F4, the sleeve (or the outer nut) 25 is replaced with a restricting sleeve 28 that has no male or female thread. The other construction is the same as the third configuration.

The restricting sleeve 28 may be made of metal or resin and is press-fitted into a press-fitting hole 27 formed at the inlet portion of the head receiving hole 20. Therefore, the male thread of the outer nut 25 and the threaded hole 26 formed at the inlet of the head receiving hole 20 of the third configuration F3 are no longer necessary. Hence, the fourth configuration F4 can be incorporated at a lower cost than the third configuration F3. Also with this arrangement, even in the case that the fixing screw 10 has been loosened and the threaded shank 10b has been completely removed from the stationary nut 12, the threaded shank 10b can be held inserted into the corresponding insertion hole 11a of the sleeve 11, so that the fixing screw 10 can be prevented from being removed. Therefore, the fixing screw 10 can be prevented from being removed from the boss portion 8a and eventually from the protector cover 8.

Fifth Configuration

Figure 11:
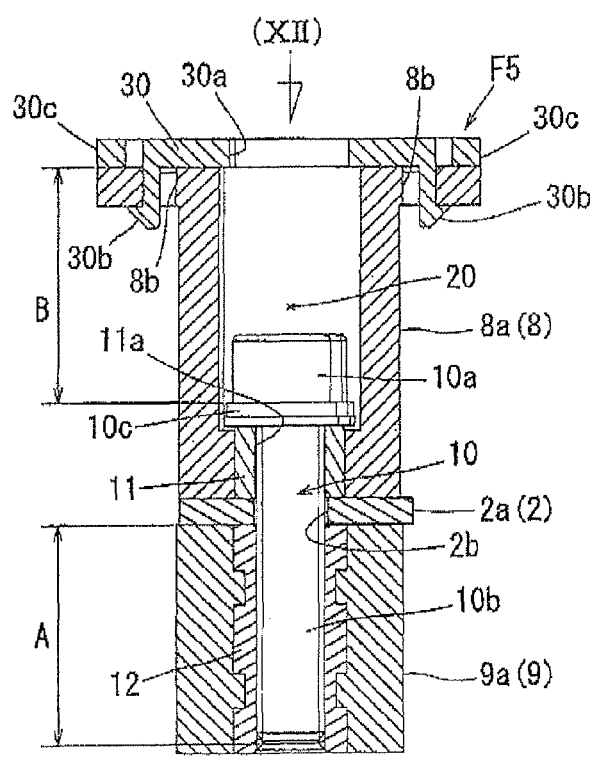
FIG. 11 is a vertical sectional view of a fifth configuration for preventing removal of a coupling member.
Figure 12:
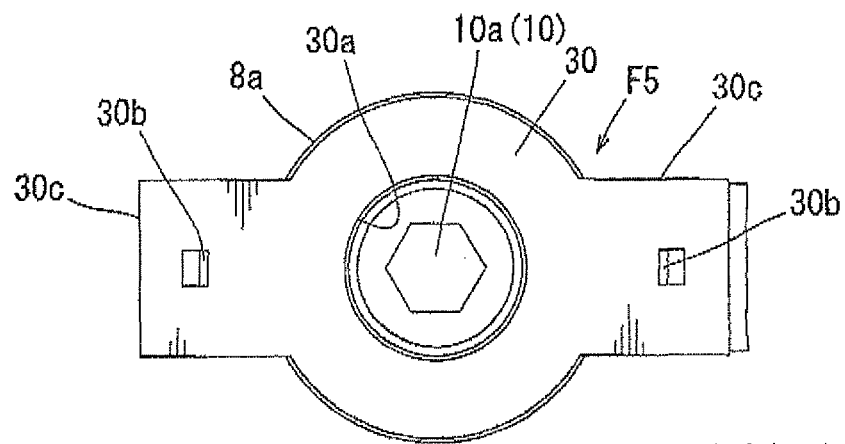
FIG. 12 is a plan view as viewed in a direction of arrow XII in FIG. 11 of the fifth configuration.

A fifth configuration F5 will now be described with reference to FIGS. 11 and 12. In this fifth configuration F5, the rubber ring 13, the outer nut 25 or the restricting sleeve 28 of the above configurations is replaced with a cover 30 that partly closes the inlet portion of the head receiving hole 20.

The cover 30 is made of resin and can be molded as a one-piece member. At the central portion of the cover 30, an access hole 30a is formed to allow insertion of a hexagonal wrench into the head receiving hole 20 for engagement with the head 10a of the fixing screw 10. The diameter of the access hole 30a is set to allow passage of the head 10a but prevent the washer 10c from passing therethrough. The cover 30 has a pair of right and left arms 30c extending in right and left directions. Each of the arms 30c has an engaging claw 30b protruding downwardly therefrom. In correspondence with the engaging claws 30b, a pair of engaging holes 8b are formed in an upper portion of the boss portion 8a at positions on opposite sides with respect to the inlet opening of the head receiving hole 20 and proximal to the inlet opening. The engaging claws 30b can engage the engaging holes 8b by inserting the engaging claws 30b from the above, so that the cover 30 is mounted to the upper portion of the boss portion 8a to partly close the inlet opening of the head receiving hole 20. Also in this configuration F5, the relationship between the maximum tightening depth "A" of the threaded shank 10b into the stationary nut 12 and the distance "B" between the washer 10c and the cover 30 is set to be the same as in the first to fourth configurations F1 to F4.

Also with this configuration F5, even in the case that the fixing screw 10 has been loosened and the threaded shank 10b has been completely removed from the stationary nut 12, the washer 10c cannot pass through the access hole 30a, and therefore, the head 10a of the fixing screw 10 is prevented from being removed from the head receiving hole 20 and the threaded shank 10b can be held inserted into the corresponding insertion hole 11a of the sleeve 11. Therefore, the fixing screw 10 can be prevented from being removed from the boss portion 8a and eventually from the protector cover 8.

The configuration F5 can be modified in various ways with respect to means for mounting the cover 30 to the boss portion 8a. For example, in place of the engagement between the engaging claws 30b and the engaging holes 8b, screws can be used for mounting the cover 30 to the boss portion 8a.

Sixth Configuration

Figure 13:
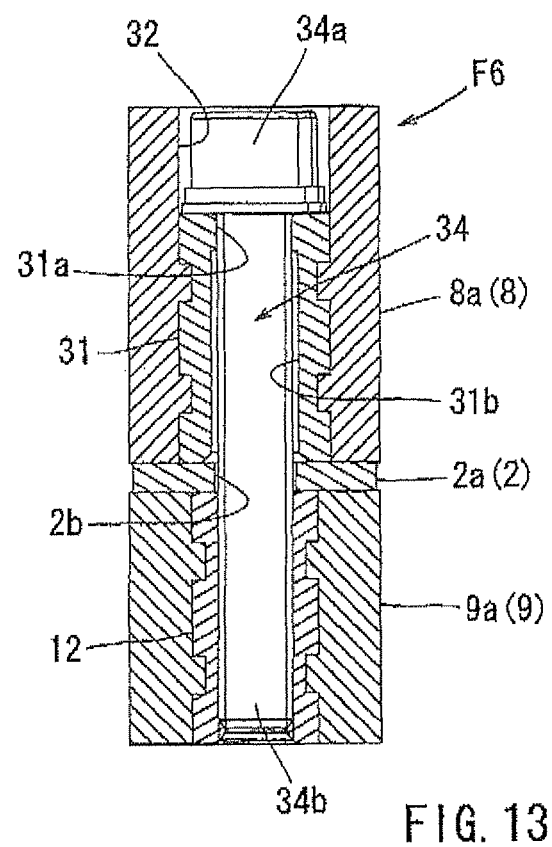
FIG. 13 is a vertical sectional view of a sixth configuration for preventing removal of a coupling member.
Figure 14:
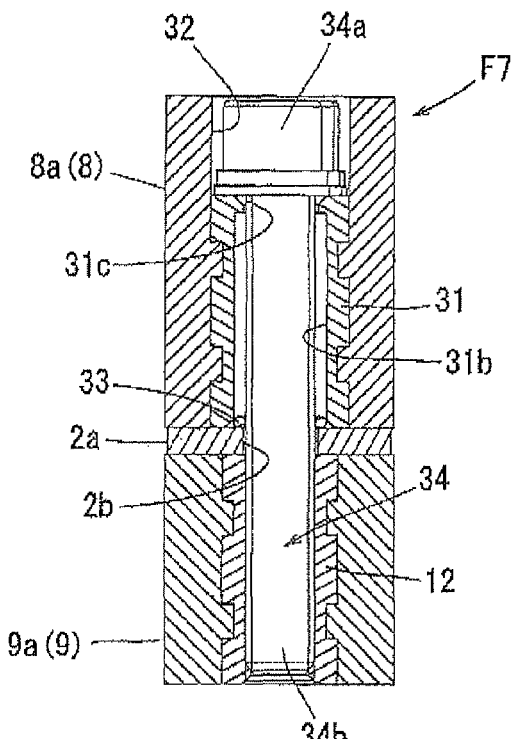
FIG. 14 is a vertical sectional view of a seventh configuration for preventing removal of a coupling member.

A sixth configuration F6 will now be described with reference to FIG. 13. In this sixth configuration F6, a restricting sleeve 31 is mounted within the protector cover 8 for preventing removal of the fixing screw 34. More specifically, the restricting sleeve 31 is mounted within the protector cover 8 by an insertion molding process, in which the protector cover 8 is molded with the restriction sleeve 31 inserted into a molding die. The restricting sleeve 31 has a threaded hole 31a and a relief hole 31b formed therein in series with each other. The threaded hole 31a is formed within an upper end portion of the restricting sleeve 31 and extends along a limited length. The relief hole 31b extends along the remaining length of the restricting sleeve 31 and has a diameter larger than a diameter of a threaded shank 34b of a fixing screw 34 that corresponds to the fixing screw 10. The diameter of the threaded hole 31a is set to be the same as the threaded hole of the stationary nut 12 of the protector body 9.

In order to couple the protector cover 8 to the protector body 9 for coupling the protector 7 to the support rod 2, the threaded shank 34b of the fixing screw 34 is first engaged with the threaded hole 31a and is thereafter engaged with the stationary nut 12. In the coupling state of the protector 7 to the support rod 2, where the fixing screw 34 has been completely tightened, the leading end portion of the threaded shank 34b is engaged with the stationary nut 12 while the base portion (upper portion) of the threaded shank 34b is engaged with the threaded hole 31a. As the fixing screw 34 is loosened, the threaded shank 34b is moved relative to both of the threaded hole of the stationary nut 12 and the threaded hole 31a of the restricting sleeve 31. Even after the fixing screw 34 has been loosened enough to disengage the threaded shank 34b from the threaded hole of the stationary nut 12, the threaded shank 34b is still engaged with the threaded hole 31a of the restricting sleeve 31. Therefore, even in the case that the fixing screw 34 has been accidentally excessibly loosened, the fixing screw 34 can be prevented from being removed from the restricting sleeve 31 and eventually from the boss portion 8a.

In the case of this sixth configuration F6, the length of the fixing screw 34 is substantially twice the length of the fixing screw 10 used in the first to fifth configurations. In addition, in the case of the sixth configuration F6, the head receiving hole 20 having a relatively long depth is replaced with a head receiving hole 32 having a relatively short depth and configured as a counter bore. Thus, the depth of the head receiving hole 32 is set to be sufficient to receive a head 34a of the fixing screw 34 when the fixing screw 34 has been completely tightened. Further, in the case of the sixth configuration F6, it is no longer necessary to provide an element corresponding to the rubber ring 13, the outer nut 25 or the restricting sleeve 28 of the first to fourth configurations F1 to F4.

Seventh Configuration

The above sixth configuration F6 may be modified in various ways. A seventh configuration F7 is one of possible modifications of the sixth configuration F6 and will be described with reference to FIG. 14. According to the seventh configuration F7, the threaded hole 31a of the sixth configuration F6 is replaced with a restricting flange 31c that extends radially inward from the inner circumference of the upper end of the restricting sleeve 31. In addition, a rubber ring 33 is fitted on the threaded shank 34b. The rubber ring 33 may be a commercially available O-ring. The rubber ring 33 may have a size that does not allow passage of the rubber ring 33 through the inner circumferential side of the restricting flange 31c but allows axial movement of the rubber ring 33 within the relief hole 31b. Therefore, as the fixing screw 34 is tightened or loosened, the rubber ring 33 can move together with the threaded shank 34b within the relief hole 31b. However, during the loosening of the fixing screw 34, the rubber ring 33 may contact the mount flange 2a at the circumferential edge of the insertion hole 2b and may not pass through the insertion hole 2b. Therefore, the rubber ring 33 may move along the threaded shank 34b. Similarly, during tightening of the fixing screw 34, the rubber ring 33 may contact the restricting flange 31c and may not pass through the inner circumference of the restricting flange 31c. Also in this case, the rubber ring 33 may move along the threaded shank 34b.

According to the seventh configuration F7, similar to the sixth configuration F6, even in the case that the fixing screw 34 has been loosened to completely disengage the threaded shank 34b from the stationary nut 12, the removal of the fixing screw 34 is prevented by the interference of the rubber ring 33 with the restricting flange 31c. Therefore, the fixing screw 34 can be prevented from being accidentally removed from the boss portion 8a. In this way, the restricting flange 31c and the rubber ring 33 serves as a removal preventing device of the fixing screw 34.

Eighth Configuration

Figure 15:
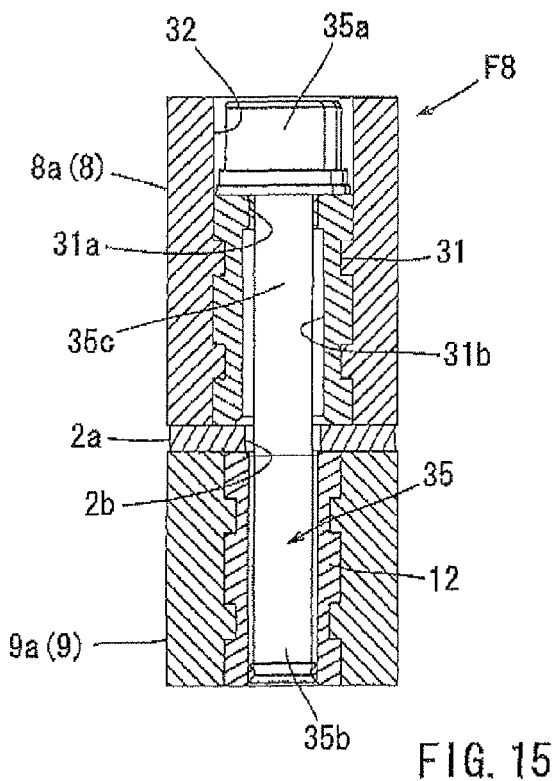
FIG. 15 is a vertical sectional view of an eighth configuration for preventing removal of a coupling member.

An eighth configuration F8 will now be described with reference to FIG. 15. The eighth configuration F8 is a modification of the sixth configuration F6 and different from the sixth configuration F6 in that a fixing screw 35 is used in place of the fixing screw 34 but the restricting sleeve 31 as used in the sixth or seventh configuration (F6 or F7) is also used in the eighth configuration F8. In the first to seventh configurations F1 to F7, the threaded shank (10b or 34b) of the fixing screw (10 or 34) has a male thread formed substantially throughout its length. In contrast, the fixing screw 35 includes a non-threaded shank 35c and a threaded shank 35b formed in continuity with the non-threaded shank 35c. The non-threaded shank 35c extends by a predetermined distance from a base portion of a head 35a of the fixing screw 35. The threaded shank 35b is provided on the leading end side of the non-threaded shank 35c and engages with the threaded hole 31a of the restricting sleeve 31. Therefor; the non-threaded shank 35c does not engage the threaded hole 31a but can extend therethough without being interfered.

Also with this eighth configuration F8, the fixing screw 35 has a length substantially twice the length of the fixing screw 10. In addition, the head receiving hole 32 configured as a counter bore has a depth shallower than the head receiving hole 20.

Therefore, even in the case that the fixing screw 35 has been loosened to completely disengage the threaded shank 35b from the stationary nut 12, the threaded shank 35b cannot pass through the threaded hole 31a of the restricting sleeve 31 unless the fixing screw 35 is rotated further in the threadably engaging state of the fixing screw 35. Hence, it is possible to prevent the fixing screw 35 from being accidentally removed from the boss portion 8a.

As noted above, in the first to fifth configurations F1 to F5, the removal of the fixing screw 10 from the boss portion 8a is prevented through interference of the head 10a with another element (i.e., the rubber ring 13, the outer nut 25, the restricting sleeve 28 or the cover 30). In contrast, in the sixth to eighth configurations F6 to F8, the fixing screw 34 (or 35) is prevented from being removed from the boss portion 8a mainly through improvements applied to the threaded shank 34b (35b). Therefore, the head receiving hole 32 may have a shallower depth than the head receiving hole 20. In addition, setting of the relationship "A≤B" as in the first to fifth configurations F1 to F5 is not necessary.

Ninth Configuration

A ninth configuration F9 will now be described with reference to FIG. 16. In the ninth configuration F9, the fixing screw 10 having a relatively short length and having a male thread formed throughout the length of the shank 10b as used in the first to fifth configurations F1 to F5 is used. In addition, the boss portion 9a of the protector body 9 and the stationary nut 12 that are the same as those in the first to eighth configurations F1 to F8 can be used. However, according to the ninth configuration F9, a direction for separating the protector cover 8 from a molding die after a molding process for manufacturing the protector cover 8 is opposite to that in the case of the first to eighth configurations F1 to F8.

Figure 16:
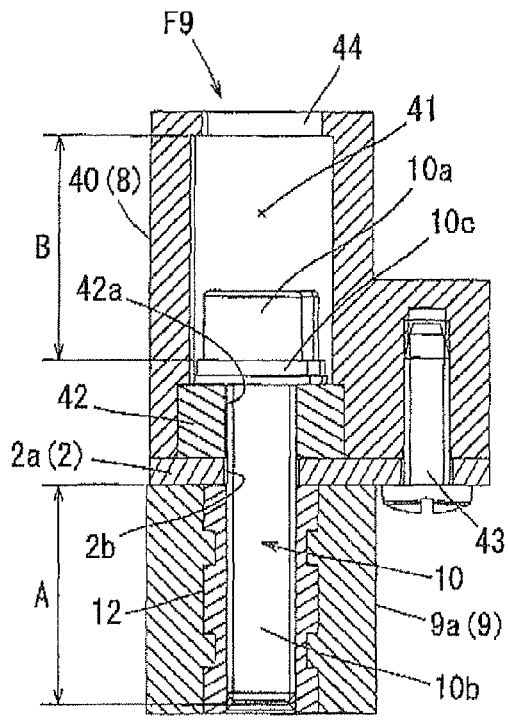
FIG. 16 is a vertical sectional view of a ninth configuration for preventing removal of a coupling member.

Referring to FIG. 16, a head receiving hole 41 is formed in a boss portion 40 of the protector cover 8 for receiving the head 10a of the fixing screw 10. Although not shown in FIG. 16, two head receiving holes 41 each receiving the head 10a of the fixing screw 10 are formed in the boss portion 40. A restricting sleeve 42 having a large outer diameter than the inner diameter of the head receiving hole 41 is fitted into a lower end portion of the head receiving hole 41. The threaded shank 10b of the fixing screw 10 is inserted into an insertion hole 42a is formed in the restricting sleeve 42.

As shown in FIG. 16, the corresponding mount flange 2a of the support rod 2 is in contact with the bottom surface of the boss portion 40, so that the restricting sleeve 42 is prevented from being removed from the support rod 2. The mount flange 2a is secured to the bottom of the boss portion 40 by a mounting screw 43. Therefore, in this configuration F9, the protector cover 8 is fixed to the right and left mount flanges 2a by the mounting screws 43.

An access hole 44 having a smaller diameter than the head receiving hole 41 is formed at the upper portion of the boss portion 40 in continuity with the head receiving hole 41, so that a hexagon wrench can be inserted into the head receiving hole 41 through the access hole 44 for engagement with the head 10a of the fixing screw 10. The diameter of the access hole 44 is determined to allow passage of the head 10a but not to allow passage of the washer 10c. Therefore, even in the case that the fixing screw 10 has been loosed to completely disengage the threaded shank 10b from the stationary nut 12 of the protector body 9, the head 10a is held within the head receiving hole 41 and the threaded shank 10b is held inserted into the insertion hole 42a of the restricting sleeve 42. In addition, even after the protector body 9 and the protector cover 8 have been decoupled from each other, the resting sleeve 42 cannot be removed unless the mounting screws 43 are loosened to remove the protector cover 8 from the support rod 2. Therefore, it is possible to prevent accidental removal of the fixing screw 10 from the boss portion 40 after the fixing screw 10 has been completely loosened.

In addition, in the case of the configuration F9, although the protector body 9 can be removed from the support rod 2, the protector cover 8 can still be held in the mounted state to the support rod 2. If it is desired to remove the protector cover 8 from the support rod 2 after the protector body 9 has been removed, it is only necessary to loosen the mounting screws 43.

Figure 17:
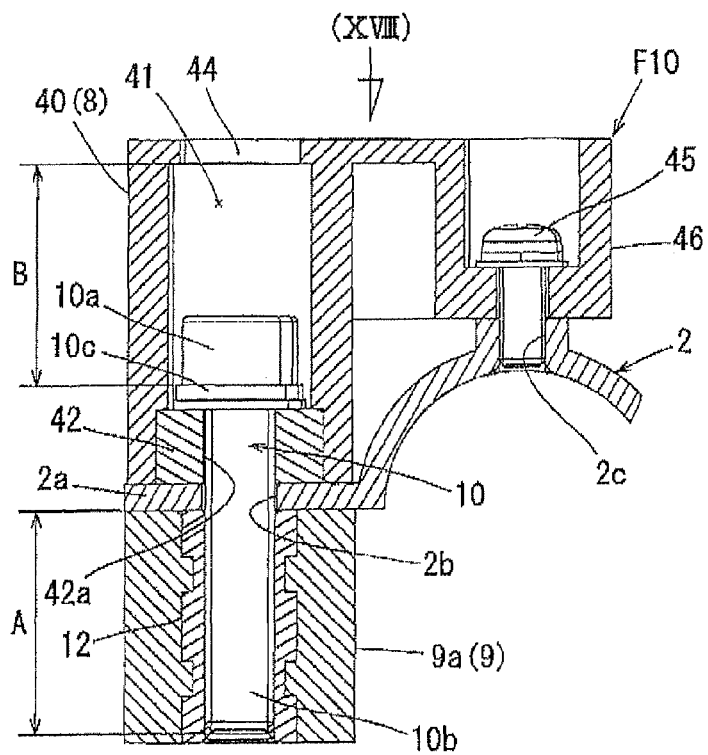
FIG. 17 is a vertical sectional view of a tenth configuration for preventing removal of a coupling member.
Figure 18:
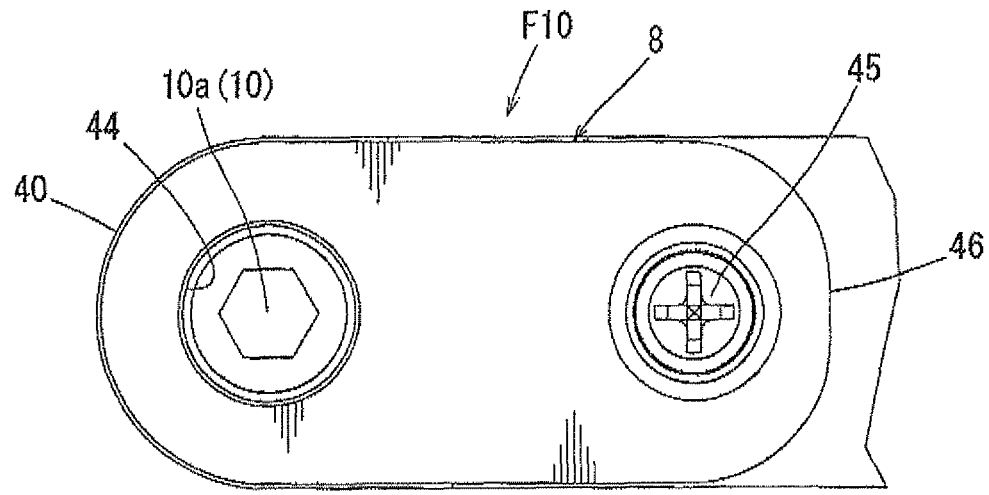
FIG. 18 is a plan view as viewed in a direction of arrow XVIII in FIG. 17 of the tenth configuration.
Figure 19:
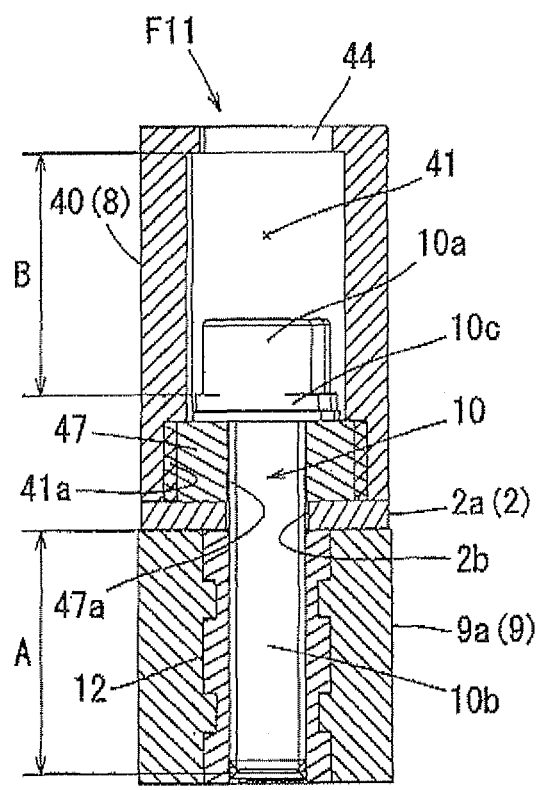
FIG. 19 is a vertical sectional view of an eleventh configuration for preventing removal of a coupling member.

Further, also in this configuration. F9, the relationship between the maximum tightening depth "A" of the threaded shank 10b into the stationary nut 12 and the distance "B" (the distance between the washer 10c and the access hole 44 in this case) is set to be "A≤B." Therefore, it is allowed to completely loosen one of the fixing screws 10 prior to loosening the other, Tenth Configuration A tenth configuration F10 will now be described with reference to FIGS. 17 and 18. This configuration is different from the ninth configuration F9 in that the tightening direction of mounting screws 45 (only one mounting screw 45 is shown in FIGS. 17 and 18) corresponding to the mounting screws 43 is opposite to that of the mounting screws 43 in the ninth configuration F9. The other construction is substantially the same as the ninth configuration F9.

More specifically, in the case of the tenth configuration F10, two auxiliary boss portions 46 (only one auxiliary boss portion 46 is shown in FIGS. 17 and 18) are formed integrally with the boss portion 40. As shown in FIGS. 17 and 18, the mounting screw 45 is inserted into an insertion hole formed in the corresponding auxiliary boss portion 46 from the upper side and is engaged with a corresponding threaded hole 2c formed in the upper portion of the support rod 2, so that the protector cover 8 is mounted to the support rod 2 by means of the mounting screws 45.

Also in this configuration F10, it is possible to prevent the fixing screws 10 from being accidentally removed from the boss portion 40 after the fixing screws 10 have been loosened for separating the protector body 9 from the protector cover 8.

Further, in the case of the tenth configuration F10, because the direction of tightening the fixing screws 10 is the same as the direction of tightening the mounting screws 45, the fixing screws 10 and the mounting screws 45 can be tightened or loosened from above by using a hexagon wrench or a screwdriver. Therefore, the assembling operation of the protector 7 can be efficiently performed.

Also in this configuration F10, the relationship between the maximum tightening depth "A" of the threaded shank 10b into the stationary nut 12 and the distance "B" (the distance between the washer 10c and the access hole 44) is set to be "A≤B." Therefore, it is allowed to completely loosen one of the fixing screws 10 prior to loosening the other.

Eleventh Configuration

In the above ninth and tenth configurations F9 and F10, the removal of the restricting sleeves 42 is prevented by the mounting flanges 2a of the support rod 2, which is mounted to the bottom of the boss portion 40 in contact relationship therewith, so that the fixing screws 10 are prevented from being removed from the boss portion 40. In contrast, in an eleventh configuration F11 shown in FIG. 19, the restricting sleeve 42 is replaced with a sleeve 47 having a male thread focused on the outer circumferential surface. The sleeve 47 will be hereinafter also called "outer nut 47." The outer nut 47 is threadably engaged with a threaded hole 41a formed at the lower end portion of the head receiving hole 41. The threaded shank 10b of the fixing screw 10 is inserted into an insertion hole 47a formed in the outer nut 47. Therefore, this configuration F11 is different from the ninth and tenth configurations F9 and F10 in that the boss portion 40 (and eventually the protector cover 8) is not directly fixed to the mounting flanges 2a of the support rod 2.

Also with the eleventh configuration F11, it is possible to prevent the fixing screw 10 from being accidentally removed from the boss portion 40, because the washer 10c cannot pass through the access hole 44 and the outer nut 47 is fixed in position at the lower end of the head receiving hole 41.

Also in the eleventh configuration F11, the relationship between the maximum tightening depth "A" of the threaded shank 10b into the stationary nut 12 and the distance "B" (the distance between the washer 10c and the access hole 44) is set to be "A≤B." Therefore, it is allowed to completely loosen one of the fixing screws 10 prior to loosening the other. In addition, although the fixing screw 10 is prevented from being removed from the boss portion 40, it may not cause any inconvenience in the maintenance work (i.e., reduction in the working efficiency of the maintenance work).

Twelfth Configuration

Figure 20:
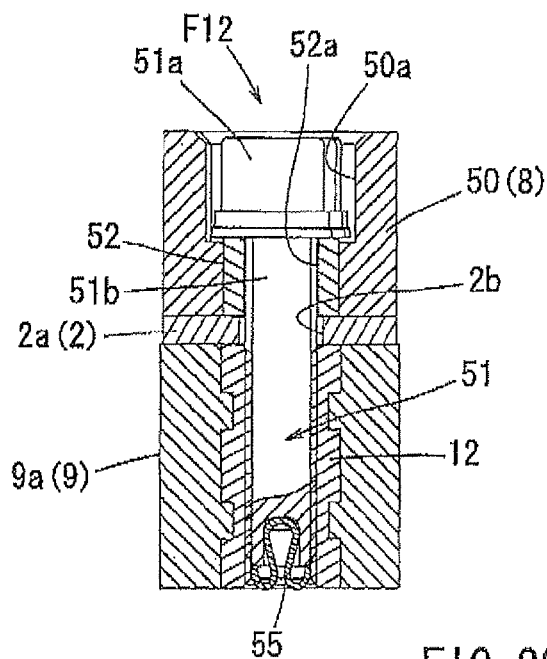
FIG. 20 is a vertical sectional view of a twelfth configuration for preventing removal of a coupling member.
Figure 21:
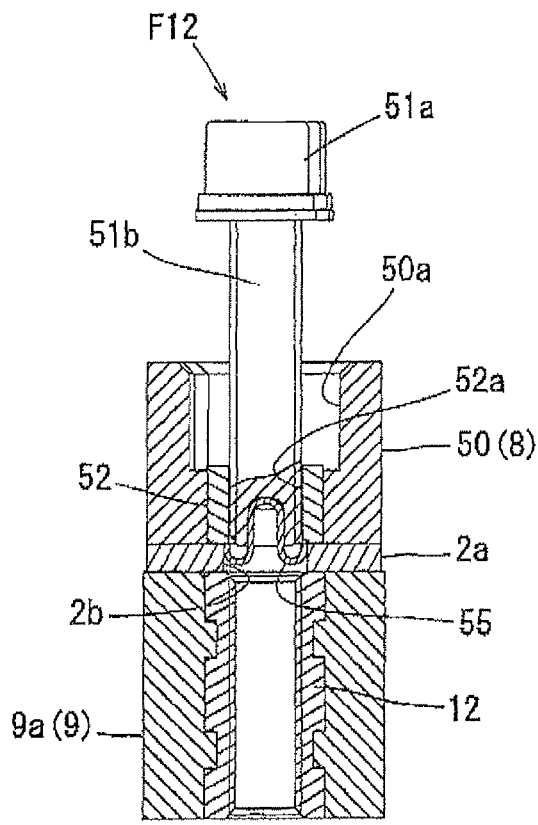
FIG. 21 is a vertical sectional view similar to FIG. 20 but showing the state where a fixing screw has been loosened.

A twelfth configuration F12 will now be described with reference to FIGS. 20 and 21. As shown in FIGS. 20 and 21, in this configuration F12, a resiliently deformable clip 55 is mounted to the leading end (lower end) of a threaded shank 51b of a fixing screw 51 in order to prevent the fixing screw 51 from being removed from a boss portion 50 of the protector cover 8. Thus, the clip 55 serves as a removal preventing device. Similar to the sixth to eighth configurations F6 to F8, a shallow head receiving hole 50a configured as a counter bore is formed in the boss portion 50 of the protector cover 8.

On the other hand, the stationary nut 12 is integrated within the boss portion 9a of the protector body 9 by an insertion molding process in the same manner as the previous configurations. A metal sleeve 52 is integrated within the boss portion 50 of the protector cover 8 by an insertion molding process. The head receiving hole 50a is formed coaxially with the sleeve 52. The threaded shank 51b of the fixing screw 51 is inserted into an insertion hole 52a formed in the sleeve 52 and further into the insertion hole 2b formed in the corresponding mount flange 2a of the support rod 2 and is then engaged with and tightened into the stationary nut 12.

However, in the eleventh configuration F11, the diameter of the insertion hole 2b of the mount flange 2a is set to be slightly larger than the insertion hole 52a of the sleeve 52. Therefore, a part of the lower end surface of the sleeve 52 is exposed to the insertion hole 2b of the mount flange 2a. In addition, the diameter of the insertion hole 2b is set to be larger enough than the diameter of the threaded hole of the stationary nut 12.

The clip 55 mounted to the leading end of the threaded shank 51b has a central portion bent into an inverted V-shape (upwardly protruding shape) and inserted into a corresponding recess formed in the leading end surface of the threaded shank 51b so as to be fixed thereinto. Opposite ends of the clip 55 are bent into a U-shape (downwardly protruding shape) from the central portion and extend radially outward from the central portion. With this arrangement, the opposite ends of the clip 55 extend radially outward from the leading end of the threaded shank 51b when no load is applied. Therefore, in the engaging state of the fixing screw 51 with the stationary nut 12, the opposite ends of the clip 55 are urged to resiliently deform radially inwardly due to contact with the threaded inner surface of the stationary nut 12. With the opposite ends of the clip 55 deformed radially inwardly, the fixing screw 51 can be tightened into and loosened from the stationary nut 12.

According to the twelfth configuration F12, as the fixing screw 51 is loosened to completely disengage the threaded shank 51b from the stationary nut 12, the opposite ends of the clip 55 move into the insertion hole 2b of the mount flange 2a. Then, the opposite ends of the clip 55 resiliently extend radially outwardly, so that the opposite ends are positioned to oppose to the lower end surface of the restricting sleeve 52 as shown in FIG. 21 and cannot move into the insertion hole 52a of the restricting sleeve 52. As a result, the fixing screw 51 is prevented from moving upward from the position shown in FIG. 21, and therefore, the fixing screw 51 is prevented from being removed from the boss portion 50.

In this way, according to the twelfth configuration F12, the clip 55 mounted to the threaded shank 51b of the fixing screw 51 prevents removal of the fixing screw 51 from the boss portion 50. Therefore, as the fixing screw 51 is loosened, the head 51a of the fixing screw 51 moves out of the head receiving hole 50a to extend upward from the boss portion 50 (this is also the same in the sixth to eighth configurations F6 to F8). For this reason, the head receiving hole 50a is not necessary to have a large depth and may be eliminated in some cases. In addition, the relationship "A≤B" required in the first to fourth configurations F1 to F4 and the ninth to eleventh configurations F9 to F11 is not necessary in the case of the twelfth configuration F12.

Possible Modifications

The above configurations F1 to F12 may be modified in various ways. For example, although the protector 7 is mounted to the support rod 2 by coupling the protector cover 8 and the protector body 9 together with an intervention of the support rod 2, the protector 7 may be mounted to any other part of the brush cutter 1 as long as it can cover the rotary blade 4. In addition, although the above configurations have been described in connection with the arrangement where the protector cover 8 and the protector body 9 are coupled together, the above configurations can also be applied to the arrangement where the protector cover 8 and the protector body 9 are mounted to the support rod 2 or the gear head 3 independently of each other.

Further, although the stationary nut 12 is provided at the boss portion 9a of the protector body 9 and the removal preventing device is provided at the boss portion 8a of the protector cover 8, this arrangement can be reversed such that the removal preventing device is provided at the boss portion 9a of the protector body 9 and the stationary nut 12 is provided at the boss portion 8a of the protector cover 8.

Furthermore, although a cap screw having a hexagon hole is used as the fixing screw in each of the above configurations, any other kind of screw or bolt can be used as the fixing screw.

Furthermore, although the washer 10c that is non-removably pre-assembled with the fixing screw 10 was used as a member having a larger diameter than the head 10a, the washer 10c may be replaced with a flange integrated with the fixing screw 10.

Further, the fixing screw may be replaced with any other fixing or coupling member, such as an insert-type clip, as long as it can couple the protector cover 8 and the protector body 9 together as it moves in the coupling direction while it can release the coupling as it is moved in an opposite direction to the coupling direction. In the ease of the fixing screw 10, the tightening direction of the fixing screw 10 into the stationary nut 12 corresponds to the coupling direction, and the loosening direction corresponds to the direction opposite to the coupling direction.

Furthermore, in the first to fifth configurations F1 to F5, the head 10a of the fixing screw 10 can pass through the removal preventing device (rubber ring 13, etc.) while the washer 10c being prevented from passing through the removal preventing device. However, it may be possible to configure such that the head 10*a* itself is prevented from passing through the removal preventing device.

Furthermore, although the above removal preventing configurations have been described for use with coupling apparatus having two coupling members, they may be applied to a coupling apparatus having only one coupling member.

Furthermore, although the brush cutter 1 was exemplified as an example of the gardening tool, the above configurations F1 to F12 can be applied to fixing devices of protectors of any other kinds of gardening tools, such as a hedge trimmer, a chain saw and a lawn mower.

The invention claims:

1. A gardening tool including a tool body having a support rod and a blade attached to the support rod, a protector for covering the blade, and a coupling device for coupling the protector to the tool body, the coupling device comprising:
   a coupling member movable in a coupling direction for coupling the protector to the tool body, and
   a removal preventing device provided at the protector and capable of restricting movement of the coupling member in a direction opposite to the coupling direction when the coupling member does not couple the protector to the tool body, wherein
   the protector includes a first member and a second member;
   the support rod has a mount flange;
   the coupling member couples the first and second members to each other with an intervention of the mount flange, so that the first and second members are coupled to the tool body;
   the first member has a receiving hole formed therein for receiving a part of the coupling member; and
   the removal preventing device is disposed at the receiving hole.

2. The gardening tool according to claim 1, wherein the coupling member is a screw and the removal preventing device comprises a rubber ring.

3. The gardening tool according to claim 2, wherein the screw has a head and a large diameter member mounted to the screw at a position proximal to the head, the large diameter member having a diameter larger than the head, so that the large diameter member can interact with the rubber ring for preventing the screw from moving in the direction opposite to the coupling direction.

4. The gardening tool according to claim 1, wherein:
   the coupling member is a screw having a head;
   the removal preventing device comprises a rubber ring;
   the receiving hole is formed in the first member of the protector for receiving the head of the screw;
   the receiving hole includes a mounting hole disposed at an inlet portion, so that the rubber ring is mounted within the mounting hole;
   at least one claw is formed on an inner circumference of an inlet of the mounting hole and extends radially inwardly therefrom, so that the rubber ring is held in position by the at least one claw.

5. The gardening tool according to claim 4, further including a relief recess formed in an inner circumference of the receiving hole at a position corresponding to the at least one claw, the relief recess enables the at least one claw to be molded together with the first member of the protector by a molding process of the first member.

6. The gardening tool according to claim 1, wherein:
   the coupling member is a screw having a head, the head serving as the part of the coupling member received by the receiving hole; and
   the removal preventing device comprises an outer nut having a male thread engaging with the receiving hole.

7. The gardening tool according to claim 1, wherein:
   the coupling member is a screw having a head, the head serving as the part of the coupling member received by the receiving hole; and
   the removal preventing device comprises a restricting sleeve fitted into the receiving hole.

8. The gardening tool according to claim 1, wherein:
   the coupling member is a screw having a head, the head serving as the part of the coupling member received by the receiving hole; and
   the removal preventing device comprises a cover mounted to the first member of the protector.

9. The gardening tool according to claim 1, wherein
   the coupling member is a screw having a head and a threaded shank, the head serving as the part of the coupling member received by the receiving hole; and
   the removal preventing device comprises a restriction sleeve integrated with the first member of the protector by an insertion molding process, the restriction sleeve having an insertion hole, into which the threaded shank of the screw is inserted.

10. The gardening tool according to claim 9, further comprising a stationary nut integrated with the second member of the protector by an insertion molding process, wherein the threaded shank of the screw engages the stationary nut, so that the movement of the screw in the direction opposite to the tightening direction into the nut is prevented by the restriction sleeve when the screw is disengaged from the stationary nut.

11. The gardening tool according to claim 1, wherein:
   the coupling member is a screw having a head, the head serving as the part of the coupling member received by the receiving hole; and
   the removal preventing device comprises a flange integrally molded with an inner circumference of an inlet portion of the receiving hole and protruding inwardly therefrom.

12. The gardening tool according to claim 1, wherein the removal preventing device comprises a clip mounted to the coupling member, the clip can resiliently deform to interact with a part of the protector for preventing the coupling member from moving in the direction opposite to the coupling direction.

13. The gardening tool according to claim 1, wherein a maximum moving distance of the coupling member required for coupling the protector to the tool body is equal to or smaller than a maximum distance between the part of the coupling member and the removal preventing device.

14. The gardening tool according to claim 1, wherein the coupling member comprises a plurality of coupling members and the removal preventing device comprises a plurality of removal preventing devices respectively corresponding to the coupling members.

15. A gardening tool including a tool body having a support rod and a blade attached to the support rod, a protector for covering the blade, and a coupling device for coupling the protector to the tool body, the coupling device comprising:
   a coupling member movable in a coupling direction for coupling the protector to the tool body, and
   a removal preventing device provided at the protector and capable of restricting movement of the coupling member in a direction opposite to the coupling direction when the coupling member does not couple the protector to the tool body, wherein
   the protector includes a first member and a second member;

the support rod has a mount flange; and the coupling member couples the first and second members to each other with an intervention of the mount flange, so that the first and second members are coupled to the tool body.

16. A gardening tool including a tool body having a blade, a protector for covering the blade, and a coupling device for coupling the protector to the tool body, the coupling device comprising:

a coupling member movable in a coupling direction for coupling the protector to the tool body, and a removal preventing device provided at the protector and capable of restricting movement of the coupling member in a direction opposite to the coupling direction when the coupling member does not couple the protector to the tool body, wherein the protector includes a first member and a second member;

the coupling member can couple the first and second members to each other with an intervention of a part of the tool body, so that the first and second members are coupled to the tool body;

the first member has a receiving hole formed therein for receiving a part of the coupling member; and the removal preventing device is disposed at the receiving hole;

the coupling member is a screw having a head;

the removal preventing device comprises a rubber ring;

the receiving hole is formed in the first member of the protector for receiving the head of the screw;

the receiving hole includes a mounting hole dispersed at an inlet portion, so that the rubber ring is mounted within the mounting hole; and at least one claw is formed on an inner circumference of an inlet of the mounting hole and extends radially inwardly therefrom, so that the rubber ring is held in position by the at least one claw.

17. The gardening tool according to claim 16, further including a stress relief recess formed in an inner circumference of the receiving hole at a position corresponding to the at least one claw, the relief recess enables the at least one claw to be molded together with the first member of the protector by a molding process of the first member.

* * * * *